United States Patent Office 2,933,037
Patented Apr. 19, 1960

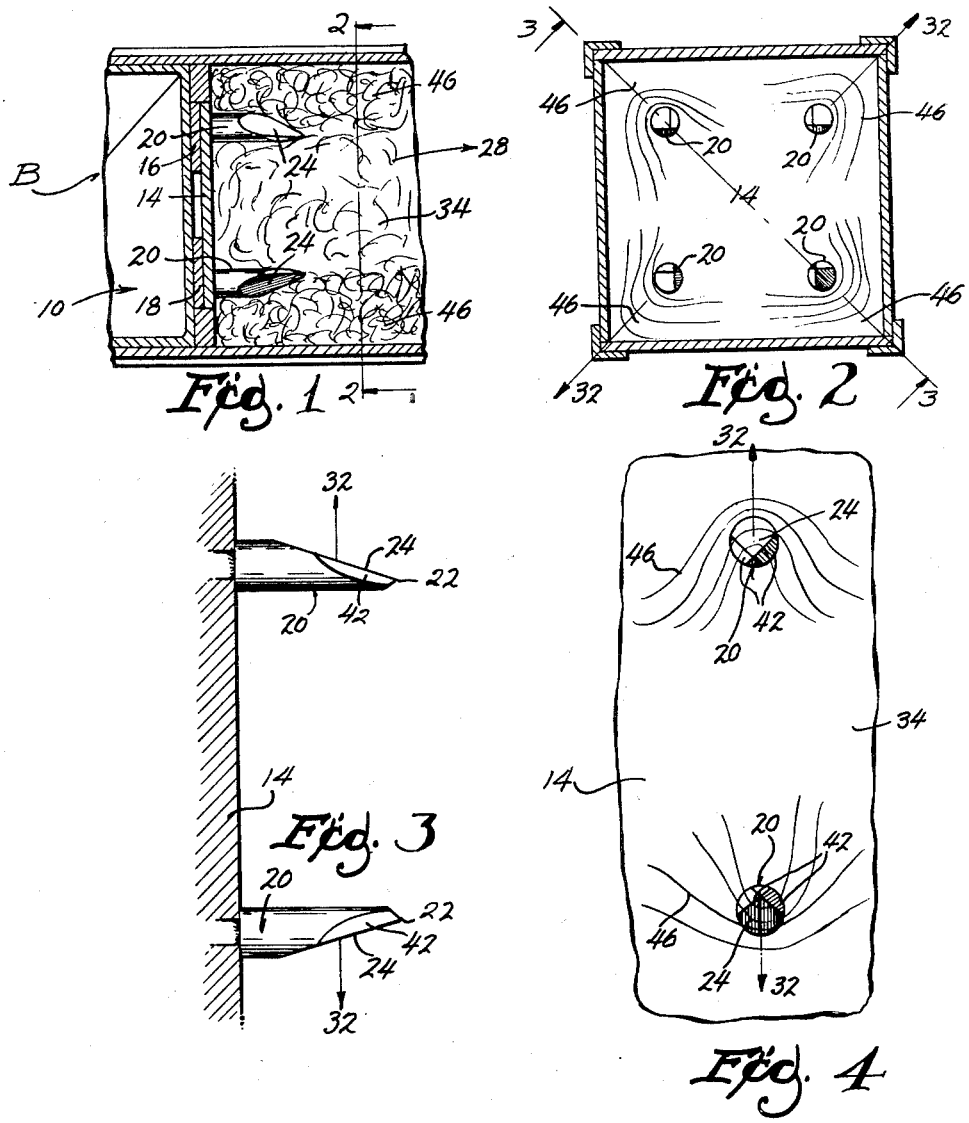

2,933,037

BALE VENTILATING MEANS

Stanley D. Russell, Racine, Wis., assignor to J. I. Case Company, Racine, Wis., a corporation of Wisconsin Original application September 29, 1950, Serial No. 187,390, now Patent No. 2,763,203, dated September 18, 1956. Divided and this application July 26, 1956, Serial No. 603,468

1 Claim. (Cl. 100—98)

This invention relates to a baler and especially to the type used in baling hay or other forage crops.

Specifically this invention relates to a means of ventilating the bale so as to accelerate the curing process in storage.

This application is a division of application Serial No. 187,390, filed September 29, 1950, for Bale Ventilating Means, issued as Patent 2,763,203, on September 18, 1956.

When baling forage crops such as hay, weather conditions often prevent the baling of the crop at the time when the material has the proper moisture content. Frequently the crop may have reached the ideal condition for baling only to be rained upon, or often the urgency of other tasks prevents baling at the proper time. Anticipation of such contingencies often forces the farmer to bale hay or forage prematurely, with the result that the bales are stored before they are cured. Hay or forage, baled before sufficient curing has taken place, may spoil by molding. The reason for spoilage is the lack of a sufficient quantity of air reaching the interior of the bale, to carry off the moisture before the molding takes place. If internal ventilation of the bale is provided, the excess moisture will be dissipated promptly and proper curing will be the result. This invention is intended to properly ventilate the crop in the process of baling, thus preparing it for subsequent curing in storage.

An object of this invention is to provide a means of ventilating the interior of a bale in the process of baling.

Another object is to provide means whereby the central portion or core of the bale is substantially of less density than the outer marginal portion; thus allowing the air to "breathe" through the bale in a more thorough manner than if the ventilating was limited to the mere piercing of relatively small holes.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

Referring to the drawings:

Fig. 1 is a fragmentary vertical sectional view of a bale chamber taken in a longitudinal plane.

Fig. 2 is a sectional view taken at 2—2 of Fig. 1.

Fig. 3 is an enlarged sectional view taken at 3—3 of Fig. 2, and

Fig. 4 is an end view of details in Fig. 3.

When referring to the baling chamber and plunger in the description which follows "forward" is to be interpreted as a movement of the plunger in the direction effecting a compression of the bale, and "inwardly" is to be interpreted as being in a direction toward the horizontal axis of the chamber.

Referring to Fig. 1, B is a fragment of a baler taken in a plane longitudinally of the chamber. A plunger 10 reciprocates in the chamber against hay or other crop which is fed into the chamber by any of the usual methods.

As the material is fed into the chamber and the plunger 10 continues to reciprocate, the material is compacted and finally tied into bales of the conventional length. The resulting bales often contain a crop which has not had time to cure properly.

Referring to Figs. 1, 2 and 3, the plunger 10 is provided with a bale ventilator plate 14, which is securely bolted to the plunger by bolts. A pair of spacer boards 16, 18 serve to bring the bale ventilator plate 14 flush with the surrounding plunger frame.

A plurality of ventilating prongs 20, in this instance, are welded or otherwise secured to the ventilator plate 14, in the positions shown in Figs. 1 through 4. Prongs 20, in this instance, are provided with bases of cylindrical cross section and of the general shape shown. The extreme points 22 being beveled to assure durability and more elapsed time before sharpening is required.

An important feature of this invention is the shape of the ventilating prongs 20.

Prongs 20 are provided with forwardly and inwardly directed faces 24 which terminate in the forwardly directed points 22. It is clear that when the plunger 14 travels to the right or in the direction of the arrow 28 of Fig. 1, the face of plate 14 tends to compact the material in the direction of the arrow 28, which material is composed of substantially long stems entwined together in a matted mass. When the material is being compressed it is simultaneously engaged by the faces 24 of prongs 20, with the result that the stems passing over the faces 24 are compelled to move up the latter and consequently are drawn outwardly from the core of the bale in the direction 32 and which is indicated in Figs. 3 and 4. When the stems are drawn outwardly from the core the latter becomes of less density as indicated at 34 of Figs. 1 and 4 thus allowing air to circulate freely through the core and effect thorough curing of the baled material.

It has been found that molding takes place where the material is too dense to allow the air to circulate therethrough. Obviously the core of the bale is the most likely point for molding to take place and by making a bale of less density through the core, a bale is obtained which will cure rapidly in storage and not be liable to spoilage by molding. The outer margin of the bale will cure properly owing to the fact that this portion has interstices that allow access to the air a sufficient distance inwardly to effect proper curing of the crop. The prongs 20 leave additional ventilating openings approximately of the shape of their cross section.

Prongs 20 having cylindrical bases, are provided with points 22 in order to facilitate their penetration of the material being baled with the least amount of resistance, and which points are positioned inwardly relative to the axis of the prongs.

Prongs 20 are also provided with outward planar faces 24 which incline forwardly and inwardly toward the horizontal axis of the bale chamber and terminate in points 38 as shown in Figs. 1 and 2. Also provided are chamfered faces 42 on opposed sides in order to remove sharp edges most subject to damage, and outwardly diverging planar faces to slightly blunt the point 22 in the interest of durability.

When the plunger moves forwardly and engages the material to be baled long portions of the stems will be drawn outwardly in the direction of the arrow 32, and as indicated at 46 of Fig. 4.

It will be readily understood that this invention will result in producing bales having a center core portion that will permit air to circulate and thus hasten the proper curing of the bale and prevent molding of the crop.

The above being a complete description of an illustrative embodiment of the invention, what is claimed as new and desired to be secured by Letters Patent of the United States is:

In a baler having a baling chamber, and a plunger reciprocating on a central axis of said chamber and having a pressing surface normal to said axis, a bale ventilating means comprising a plurality of generally-cylindrical prongs perpendicularly secured to said surface in positions spaced from said axis, and having cylindrical base portions, and planarly truncated end portions terminating in a point remote from said surface, each end portion being defined by a plane truncating surface on a side of each prong facing away from said axis, and a surface in continuation of said cylindrical base on the side of the prong facing toward said axis, the point of each prong lying to one side of the longitudinal center line of the cylindrical base portion thereof and toward said axis, said plane truncating surface converging toward said axis in a direction toward said point, whereby said prongs are adapted to puncture material being compacted in said chamber and said plane truncating surface tends to force said material outwardly in a direction away from said axis to provide in the compacted material, a zone of less density at the center thereof.

References Cited in the file of this patent
UNITED STATES PATENTS

| | | |
|---|---|---|
| 280,333 | Summers | June 26, 1883 |
| 318,601 | Cronk | May 26, 1885 |
| 1,570,604 | Aram | Jan. 26, 1926 |
| 1,893,258 | Washburn | Jan. 3, 1933 |
| 2,413,522 | Russell | Dec. 31, 1946 |
| 2,587,771 | Schoenbaum et al. | Mar. 4, 1952 |

FOREIGN PATENTS

| | | |
|---|---|---|
| 18,487 | Great Britain | 1901 |